Nov. 15, 1966 R. E. ASHBY 3,285,229
VERTICALLY SUSPENDED AUTOMATICALLY SUPPLIED WATERING TROUGH
Filed Oct. 9, 1964 2 Sheets-Sheet 1
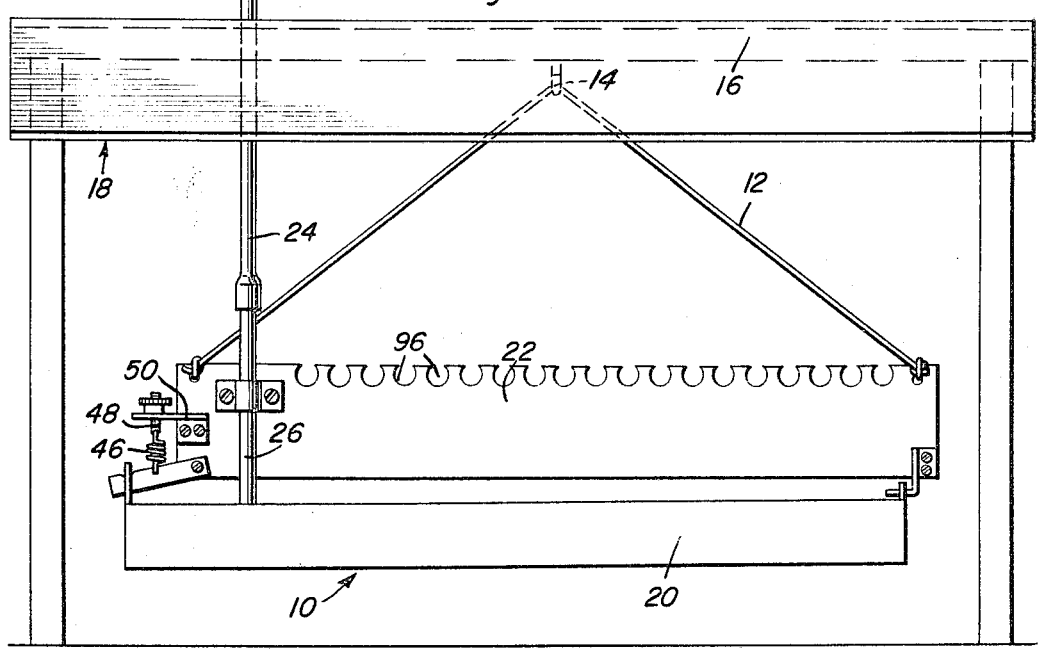
Fig. 1
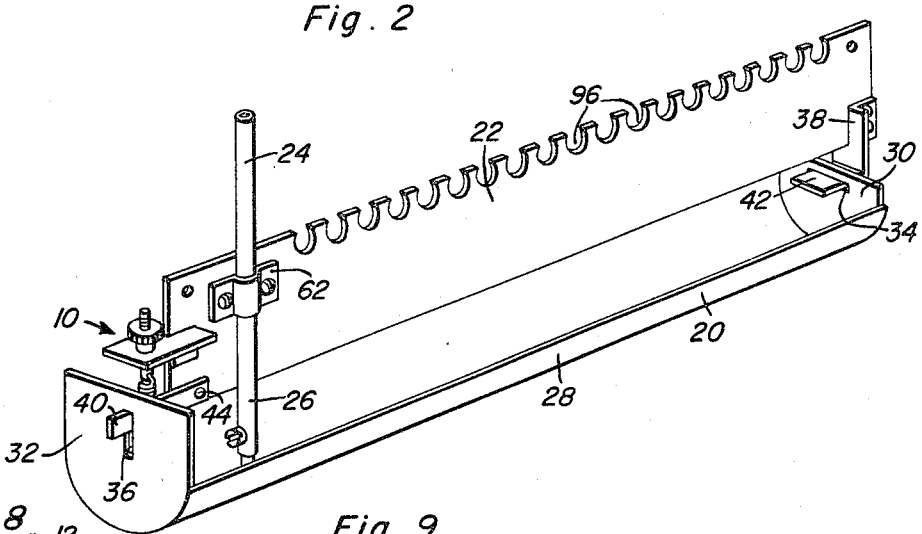
Fig. 2
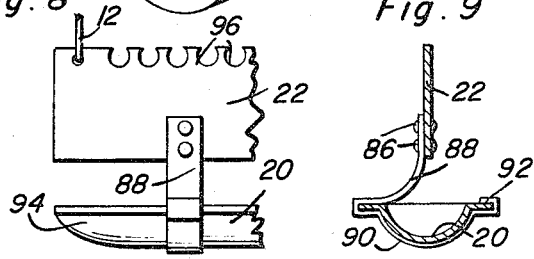
Fig. 8  Fig. 9
Ralph E. Ashby
INVENTOR.
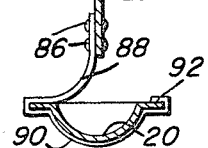

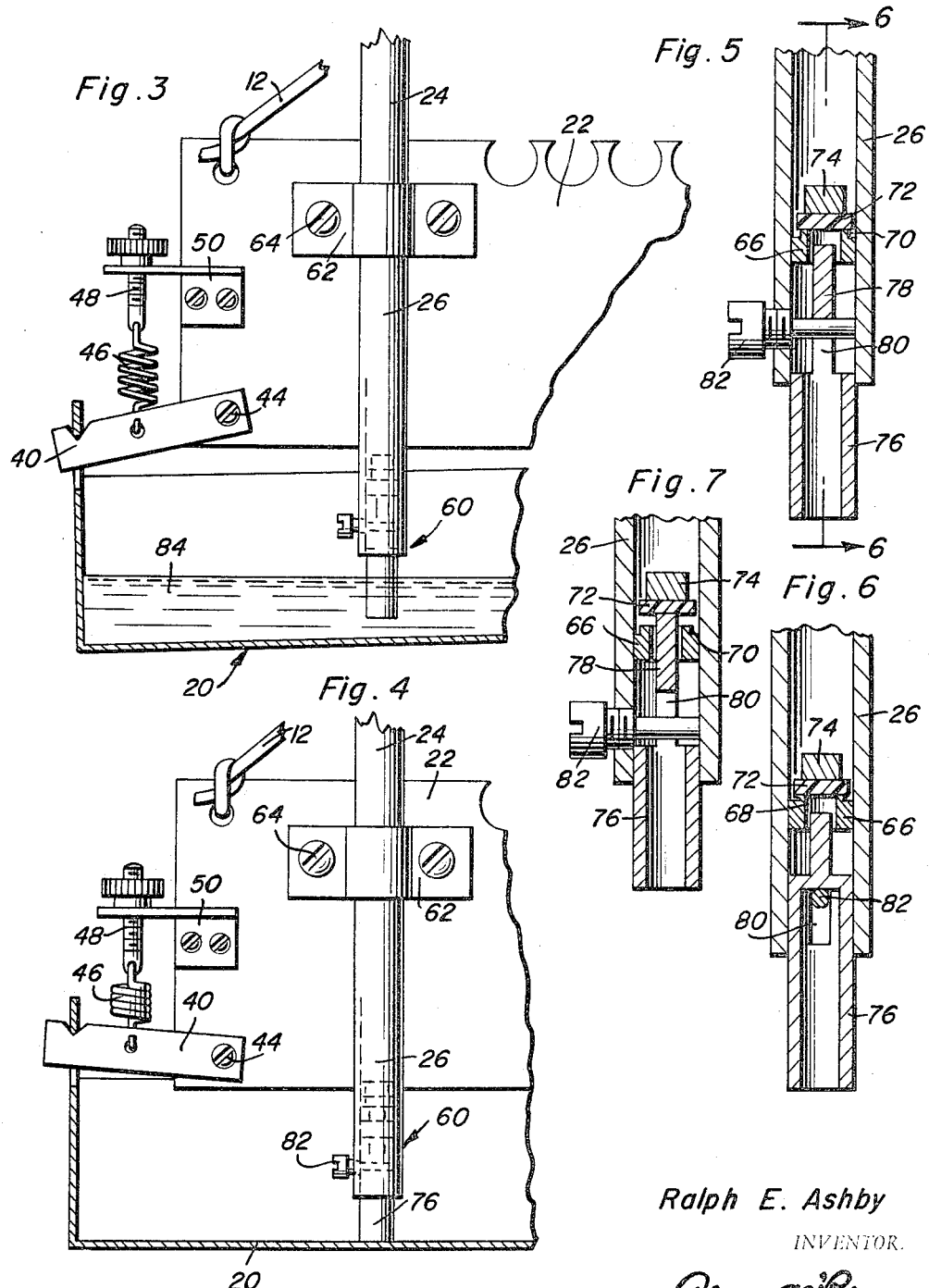

United States Patent Office 3,285,229
Patented Nov. 15, 1966

1

3,285,229
VERTICALLY SUSPENDED AUTOMATICALLY
SUPPLIED WATERING TROUGH
Ralph E. Ashby, P. O. Box 52, Downsville, La.
Filed Oct. 9, 1964, Ser. No. 402,889
8 Claims. (Cl. 119—81)

This invention comprises a novel and useful vertically suspending automatically supplied watering trough and relates generally to an automatic poultry fountain of the type disclosed in my prior Patents Nos. 2,825,301 of March 4, 1958; 3,023,733 of March 6, 1962 and 3,108,573 of October 29, 1963, and constitutes important improvements thereover.

It is the primary object of this invention to provide an automatic poultry watering device of a trough-like character of a simple unitary construction such that it may be quickly and easily mounted in operative position in a variety of different installations.

It is a further object of the invention to provide a device in accordance with the preceding object which shall include as a component thereof a member functioning jointly to support the trough for tilting movement and thus effect automatic operation of the trough filling device and also to function as a guard to prevent poultry from getting into or roosting on the trough and thus soiling its contents.

A further object of the invention is to provide a compact simple unitary automatic poultry watering installation which may be very quickly applied or removed from a poultry house or the like and which when applied shall automatically maintain the trough filled with drinking water and will replace that drinking water as may be required.

These together with other objects and advantages which will be subsequently apparent reside in the details of construction and operation as more fully hereinafter described and claimed, reference being had to the accompanying drawings forming a part hereof, wherein like numerals refer to like parts throughout, and in which:

FIGURE 1 is a view in side elevation of the exemplary embodiment of the automatic poultry watering device and its quickly installed or removed mounting means, being shown in an operative position;

FIGURE 2 is a perspective view of the trough connected to its mounting member and showing the unitary assemblage of the device;

FIGURE 3 is a fragmentary detail view taken upon an enlarged scale of one end of the trough and its mounting means, the trough being shown in vertical longitudinal section and in the downwardly tilted or full position of the trough;

FIGURE 4 is a view similar to FIGURE 3 but showing the trough in its upwardly tilted and partially emptied position, with the control valve being open to admit additional water thereto;

FIGURE 5 is a detail view in vertical central section taken upon an enlarged scale of the control valve assembly of the device, the latter being shown in its valve closed position;

FIGURE 6 is a view taken at right angles to FIGURE 5 substantially upon the plane indicated by the section line 6—6 of FIGURE 5;

FIGURE 7 is a view similar to FIGURE 5 but showing the valve in its open position for replenishing the water supply in the trough;

FIGURE 8 is a fragmentary detail view in side elevation of one end of the trough showing a preferred construction thereof having a shallow sloping bottom wall to facilitate cleaning of the trough; and FIGURE 9 is a detail view in vertical transverse section showing a modified and preferred arrangement for supporting the trough from the support member.

In the accompanying drawings there is disclosed an exemplary embodiment of an automatic poultry watering device in accordance with this invention which constitutes a very compact unit, easily transported or stored and readily installed for use or removed as may be desired.

Referring first to FIGURE 1 it will be observed that the numeral 10 designates generally the automatic poultry watering device in accordance with this invention which is shown as being suspended as by a cable 12 constituting the mounting means and which may be secured as to a hook 14 carried by a cross member 16 of a suitable support structure indicated generally by the numeral 18. It will be understood that this support structure may be part of a poultry house, pen or the like or any other convenient location from which and by which the watering device 10 may be detachably supported.

The automatic watering device in accordance with this invention further includes as its primary component a trough 20 pivotally mounted upon and supported by a support member 22 which latter is carried by the cable 12 together with a water supply means in the form of a conduit 24 having an outlet end 26 which is disposed above and within the trough 20.

Referring now specifically to FIGURE 2 it will be observed that the trough 20 in addition to a preferably semi-circular side and bottom wall member 28 is provided with a pair of end walls as at 30 and 32. In the embodiment illustrated these end walls include horizontal and vertical slots 34 and 36, respectively by means of which support brackets 38 and 40, fixedly pivotally mounted respectively upon the support member 22 are engaged in the slots to support the trough.

It will be observed from FIGURE 2 that the trough may be readily applied to and removed from the support members by a longitudinal movement of the trough with respect thereto.

It will be further noted that the support member 38 includes a horizontally extending portion or blade 42 comprising a transverse pivot about which one end of the trough is tiltable. The member 40 is pivotally secured to the support member 22 as by a pivot pin 44 and a spring 46 carried by an adjusting nut 48 and extending through a mounting bracket 50, which latter is fixedly secured to the support member 22 as shown in FIGURE 1, so as to adjustably support the other end of the trough for tilting movement.

The tension of the spring can be varied in order to vary the resistance to downward tilting of the trough, the spring normally serving to cause the end of the trough to tilt upwardly to the position shown in FIGURE 4.

The spring will be so adjusted that when the trough is substantially full of water, it will be tilted to its lowered position shown in FIGURE 3, whereas when the trough has an inadequate supply of water therein or is empty the spring will tilt the trough to its upper position as shown in FIGURE 4. Use is made of this tilting movement to automatically operate the control valve assembly indicated generally by the numeral 60, see FIGURES 5–7 in particular and which is secured to the lower end of the outlet end 26 of the conduit 24.

Referring to FIGURES 3 and 4 it will be observed that a bracket 62 fastened as by screws 64 is secured to the side of the support member 22 and thus rigidly mounts and holds the outlet end 26 of the conduit 24 in a fixed relation thereon in order that the automatic control valve assembly 60 may be operatively associated with the trough 20.

Referring now to FIGURES 5–7 it will be observed that the outlet end 26 is open and has fixedly secured therein an annular member or ring 66 with an axial passage 68 therethrough. The member 66 at its upper end is provided with a centrally disposed upwardly projecting annular rib 70 whose top surface constitutes a valve seat engageable by a valve disk 72. A suitable weight 74 may be secured to or merely rest upon the top of the valve disk 72 to gravity urge the latter into its seated position upon the top of the seat member 66 as shown in FIGURES 5 and 6.

A valve actuator is also movably secured in the open lower end of the outlet end 26, consisting of a plunger having its lower portion constituting a hollow tube or sleeve 76 from which rises an axially disposed plate-like or rod-like stem 78 slidably and loosely received in the bore 68 of the valve seat member 66. The stem is provided with a vertically elongated slot 80 and a retaining member in the form of a bolt 82 extends transversely across the interior of the outlet portion or end 26 and through the slot 80 to thereby retain the valve plunger in place and to limit its upward and downward travel between the extremes shown in FIGURES 5 and 7.

The arrangement is such that the valve is gravity urged as well as being urged by the pressure of the water within the conduit 24 to its lower or seated position shown in FIGURES 5 and 6. In this position, the upper end of the valve stem 78 is disengaged from the disk valve 72 which thus seats upon the valve seat member 66 as shown in these figures. At this time, it will be understood that the trough 20 has a sufficient quantity of water as at 84 therein so that the weight of this water will urge the trough downwardly to a downwardly tilted position at which time the actuator's lower end is out of contact with the trough bottom.

However, when the supply of water in the trough is sufficiently reduced so that the weight thereof is insufficient to overcome the tension of the spring 46, the latter will cause the trough to raise to the position shown in FIGURE 4 at which time the bottom of the trough will abut and move the plunger upwardly to its open position, as shown in FIGURE 7, with the valve actuator thus raising the valve 72 from its seat and permit water to flow downwardly into the trough.

It will thus be apparent that there has been provided a very simple means for automatically retaining the trough replenished with water and wherein the water level can be readily adjusted by varying the tension of the trough lifting and valve actuating spring 46.

In the form illustrated and described, it will be observed that the trough is pivoted at one end wall 30 upon the member 42 for vertical tilting about a horizontal transverse axis. It will be appreciated, however, that the pivotal mounting of the trough may be located at any point along its length rather than merely at the end thereof. For example, the arrangement as shown in FIGURE 9 may be satisfactorily employed. In this form, the support member 22 has fixedly secured thereto as by fasteners 86 a strap 88 having a lower portion 90 contoured to fit and underlie the bottom surface of the trough and with the other end of the strap as at 92 being inturned to embrace a marginal edge of the trough 20. Further, in this form of of the invention shown in FIGURE 8 instead of having a substantially perpendicular end wall 30, it is preferred that the trough shall be provided with a shallow inclined end and bottom portion as at 94 which will greatly facilitate the application of a cleaning tool to the interior of the trough and facilitate cleaning of the trough.

It is an important feature of this invention that the support member 22 shall also function as a guard to prevent soiling of the trough by poultry and the like. For this purpose, the member 22 is preferably of a vertical blade-like or plate-like character which is disposed substantially medially and longitudinally above the trough. The top edge of this member is provided with serrations or scallops as at 96 which will effectively prevent poultry from roosting upon the top of the support member or guard. In addition, the medial disposition of the support member prevents poultry from roosting upon the edge of the trough, thereby preventing soiling of the trough by the poultry.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An automatic poultry watering device comprising an elongated trough, an elongated rigid member paralleling said trough centrally thereabove, said rigid member being of a length substantially coextensive with the length of said trough, means engaged with the opposite end portions of said member for projection thereabove into engagement with a suitable overhead support, means on each end portion of said member engaged with said trough for the suspension of said trough directly and solely from said member, said member being located immediately above said trough so as to prevent the entry of poultry thereinto, a water conduit, said conduit having an outlet end portion extending into said trough adjacent a first end thereof, an automatic control valve assembly secured to and controlling flow from the outlet end of the conduit and in water control contact with the trough bottom, and means releasably fixing said conduit end portion to said member adjacent a first end thereof for selective disengagement therefrom.

2. The device of claim 1 wherein said rigid member comprises a vertically orientated flat plate, said plate including a substantially full length upper edge defined so as to prevent roosting of poultry thereon.

3. The device of claim 2 wherein the means on the end portion of said member engaged with the first end of the trough for the suspension of said trough comprises means for enabling a limited vertical movement of said one end, the means on the end portion of said member engaged with the second end of the trough defining a pivotal connection with said trough at said second end.

4. The device of claim 3 wherein both of the end means engaged with said trough are longitudinally directed for disengagement from said trough upon a longitudinal shifting of the trough.

5. The device of claim 2 wherein the means on the end portion of said member engaged with the first end of the trough for the suspension of said trough comprises means for enabling a limited vertical movement of said one end, the means on the end portion of said member engaged with the second end of the trough comprising a strap completely underlying said trough and slidably engaging the opposite edges thereof.

6. An automatic poultry watering device comprising a horizontally extending vertically orientated substantially flat plate, suspension means engaged with the plate toward the opposite ends thereof near the upper edge of the plate for suspension of the plate from an overhead support, support brackets fixed to the opposite end portions of said plate, an elongated trough paralleling said plate immediately therebelow, said support brackets releasably engaging the opposite ends of said trough and supporting said trough below said plate, a mounting bracket fixed to one side of said plate, and a water conduit releasably fixed to said plate by said mounting bracket, said conduit having a discharge end directed downwardly into said trough and including a valve means in water control contact with the trough.

7. The device of claim 6 wherein said flat plate, through the support brackets, constitutes the sole means supporting said trough, said flat plate having the upper edge thereof defined so as to prevent roosting of poultry thereon, the entire device, aside from the conduit, being removable as a unit upon disengaging the conduit and a release of the suspension means from an overhead support.

8. The device of claim 7 wherein said valve means is gravity responsive to shut-off flow through said conduit in response to a removal of the trough.

References Cited by the Examiner

UNITED STATES PATENTS

| | | | |
|---|---|---|---|
| 1,462,751 | 7/1923 | Huntington | 119—61 |
| 2,541,622 | 2/1951 | Toadvine | 119—81 X |
| 2,634,755 | 4/1953 | Hobbs | 251—72 |
| 3,000,350 | 9/1961 | Wilson | 119—81 |
| 3,099,981 | 8/1963 | Carpenter | 119—81 X |
| 3,108,573 | 10/1963 | Ashby | 119—81 |
| 3,122,131 | 2/1964 | Warren | 119—72 |

SAMUEL KOREN, *Primary Examiner.*

ALDRICH F. MEDBERY, *Examiner.*